(12) United States Patent
Ganguli et al.

(10) Patent No.: US 11,541,910 B1
(45) Date of Patent: Jan. 3, 2023

(54) METHODS AND APPARATUS FOR NAVIGATION OF AN AUTONOMOUS VEHICLE BASED ON A LOCATION OF THE AUTONOMOUS VEHICLE RELATIVE TO SHOULDERED OBJECTS

(71) Applicant: PlusAI, Inc., Cupertino, CA (US)

(72) Inventors: Anurag Ganguli, Saratoga, CA (US); Amit Kumar, Sunnyvale, CA (US); Timothy P. Daly, Jr., San Jose, CA (US); Anurag Paul, Campbell, CA (US); Inderjot Singh Saggu, Cupertino, CA (US); Lichun Yang, Shanghai (CN)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/571,419

(22) Filed: Jan. 7, 2022

(51) Int. Cl.
  *B60W 30/12* (2020.01)
  *B60W 60/00* (2020.01)
  *B60Q 5/00* (2006.01)
  *B60Q 1/50* (2006.01)
  *B60W 30/18* (2012.01)

(52) U.S. Cl.
  CPC ......... *B60W 60/0027* (2020.02); *B60Q 1/525* (2013.01); *B60Q 5/006* (2013.01); *B60W 30/18163* (2013.01); *B60W 2300/125* (2013.01); *B60W 2420/42* (2013.01); *B60W 2420/52* (2013.01); *B60W 2530/10* (2013.01); *B60W 2552/10* (2020.02); *B60W 2552/53* (2020.02); *B60W 2554/4041* (2020.02); *B60W 2554/4042* (2020.02); *B60W 2554/4043* (2020.02); *B60W 2554/801* (2020.02); *B60W 2554/802* (2020.02); *B60W 2720/10* (2013.01); *B60W 2720/12* (2013.01)

(58) Field of Classification Search
  None
  See application file for complete search history.

(56) References Cited

U.S. PATENT DOCUMENTS

| | | | | |
|---|---|---|---|---|
| 8,436,902 | B2* | 5/2013 | Kuehnle | G01W 1/14 |
| | | | | 348/148 |
| 8,665,079 | B2* | 3/2014 | Pawlicki | G06T 7/13 |
| | | | | 340/436 |
| 8,861,791 | B2* | 10/2014 | You | G06V 10/443 |
| | | | | 382/104 |
| 9,352,777 | B2* | 5/2016 | Lavoie | H04N 7/183 |
| 9,536,155 | B2* | 1/2017 | Takemae | B60R 1/00 |
| 10,345,822 | B1* | 7/2019 | Parchami | G05D 1/0088 |
| 11,024,051 | B2* | 6/2021 | Gomezcaballero | G06T 7/73 |
| 11,034,364 | B1* | 6/2021 | Narang | G06N 20/00 |
| 11,042,155 | B2 | 6/2021 | Zheng et al. | |
| 2006/0132295 | A1* | 6/2006 | Gem | B60Q 9/008 |
| | | | | 340/438 |

(Continued)

*Primary Examiner* — Jonathan M Dager
(74) *Attorney, Agent, or Firm* — Sheppard Mullin Richter & Hampton LLP

(57) ABSTRACT

An autonomous vehicle can obtain sensor data. Upon determining that the autonomous vehicle is in a lane adjacent a shoulder, and there is an object in the shoulder, the autonomous vehicle can determine if performing a lane change maneuver out of the lane prior to the autonomous vehicle being positioned adjacent to the object is feasible. If it is, the lane change maneuver can be performed. If it is not, a nudge maneuver and/or a deceleration can be performed.

20 Claims, 4 Drawing Sheets

(56) References Cited

U.S. PATENT DOCUMENTS

| | | | | |
|---|---|---|---|---|
| 2011/0184605 | A1* | 7/2011 | Neff | G05D 1/0255 701/25 |
| 2012/0288154 | A1* | 11/2012 | Shima | G06T 7/174 382/103 |
| 2013/0151058 | A1* | 6/2013 | Zagorski | G05D 1/0289 701/1 |
| 2014/0032049 | A1* | 1/2014 | Moshchuk | G08G 1/166 701/42 |
| 2014/0249691 | A1* | 9/2014 | Hafner | B62D 15/0285 701/1 |
| 2017/0291603 | A1* | 10/2017 | Nakamura | B60W 30/095 |
| 2017/0329332 | A1* | 11/2017 | Pilarski | B60W 30/095 |
| 2018/0233034 | A1* | 8/2018 | Tachibana | G08G 1/052 |
| 2018/0267558 | A1* | 9/2018 | Tiwari | G05D 1/0257 |
| 2019/0135291 | A1* | 5/2019 | Sim | B60W 30/10 |
| 2019/0202451 | A1* | 7/2019 | Hayamizu | B60W 50/14 |
| 2019/0213290 | A1* | 7/2019 | Delva | G01M 17/007 |
| 2019/0276013 | A1* | 9/2019 | Kim | B60W 30/0956 |
| 2019/0291730 | A1* | 9/2019 | Kamiya | G06V 20/58 |
| 2019/0294170 | A1* | 9/2019 | Kazemi | G05D 1/0274 |
| 2020/0062245 | A1* | 2/2020 | Samotsvet | G06T 7/60 |
| 2020/0064855 | A1* | 2/2020 | Ji | B60R 1/00 |
| 2020/0066147 | A1* | 2/2020 | Vadillo | G05D 1/0291 |
| 2020/0150652 | A1* | 5/2020 | Urano | B60W 50/082 |
| 2020/0249684 | A1* | 8/2020 | Onofrio | G05D 1/0219 |
| 2020/0257299 | A1* | 8/2020 | Wang | G08G 1/167 |
| 2020/0355823 | A1* | 11/2020 | Tingley | G01S 13/865 |
| 2021/0061270 | A1* | 3/2021 | Parks | B60W 10/18 |
| 2021/0107567 | A1* | 4/2021 | Varunjikar | B62D 15/0265 |
| 2021/0129835 | A1* | 5/2021 | Viehmann | B62D 9/005 |
| 2021/0129865 | A1* | 5/2021 | Jeong | H04W 4/90 |
| 2021/0190536 | A1* | 6/2021 | Gil Casals | G06V 10/763 |
| 2021/0197852 | A1* | 7/2021 | Fairfield | B60W 60/001 |
| 2021/0206389 | A1* | 7/2021 | Kim | G01C 21/3415 |
| 2021/0237739 | A1* | 8/2021 | Hayakawa | B60W 30/18163 |
| 2021/0253128 | A1* | 8/2021 | Nister | B60W 60/0027 |
| 2021/0276588 | A1* | 9/2021 | Kabzan | G05D 1/0088 |
| 2021/0309217 | A1* | 10/2021 | Kim | G08G 1/165 |
| 2022/0009522 | A1* | 1/2022 | Zhang | B60W 30/12 |
| 2022/0017079 | A1* | 1/2022 | Kakeshita | B60W 10/20 |
| 2022/0017080 | A1* | 1/2022 | Moriya | B60W 30/09 |
| 2022/0017081 | A1* | 1/2022 | Yokoyama | G06K 9/6218 |
| 2022/0048499 | A1* | 2/2022 | Yang | B60W 10/18 |
| 2022/0063622 | A1* | 3/2022 | Jumpertz | B60W 30/165 |
| 2022/0063664 | A1* | 3/2022 | Liu | G08G 1/166 |
| 2022/0073095 | A1* | 3/2022 | Seitz | B60W 40/09 |
| 2022/0080977 | A1* | 3/2022 | Ucar | G01S 13/931 |
| 2022/0105931 | A1* | 4/2022 | Motegi | B60W 30/12 |

* cited by examiner

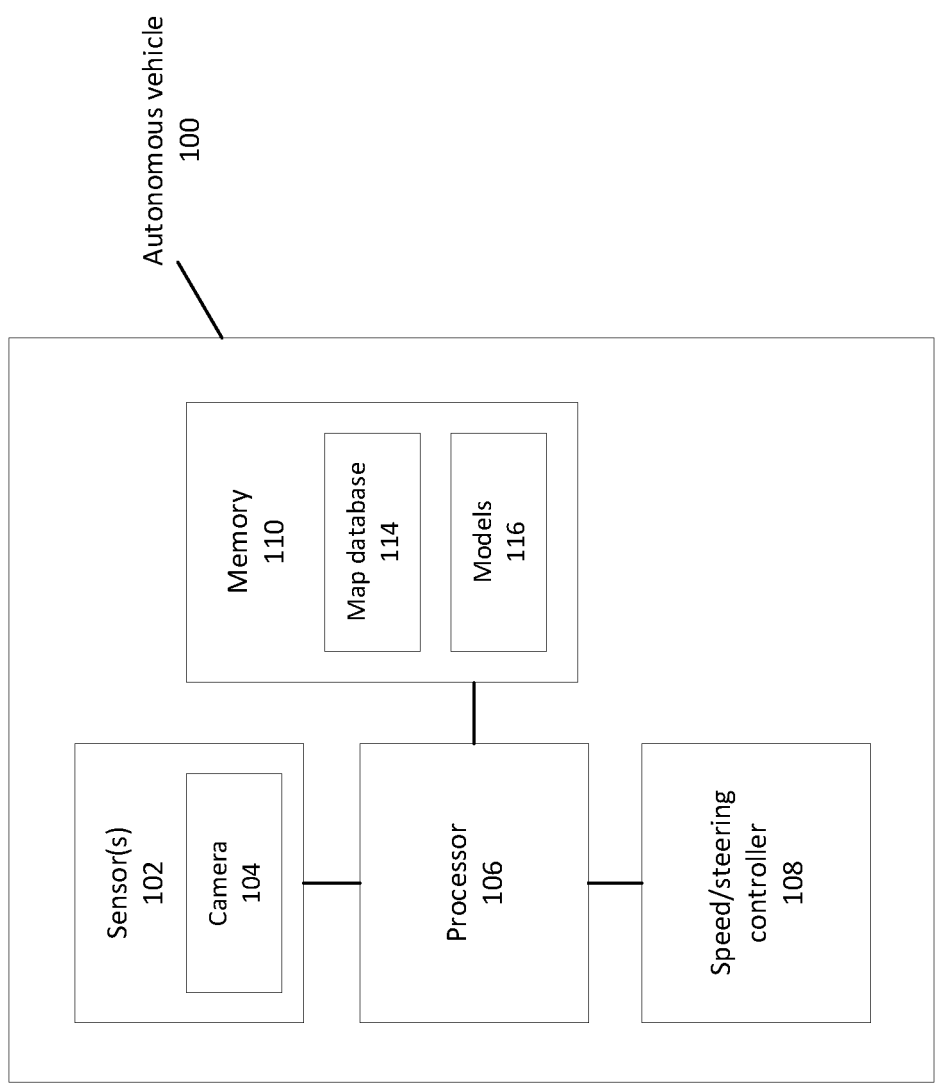

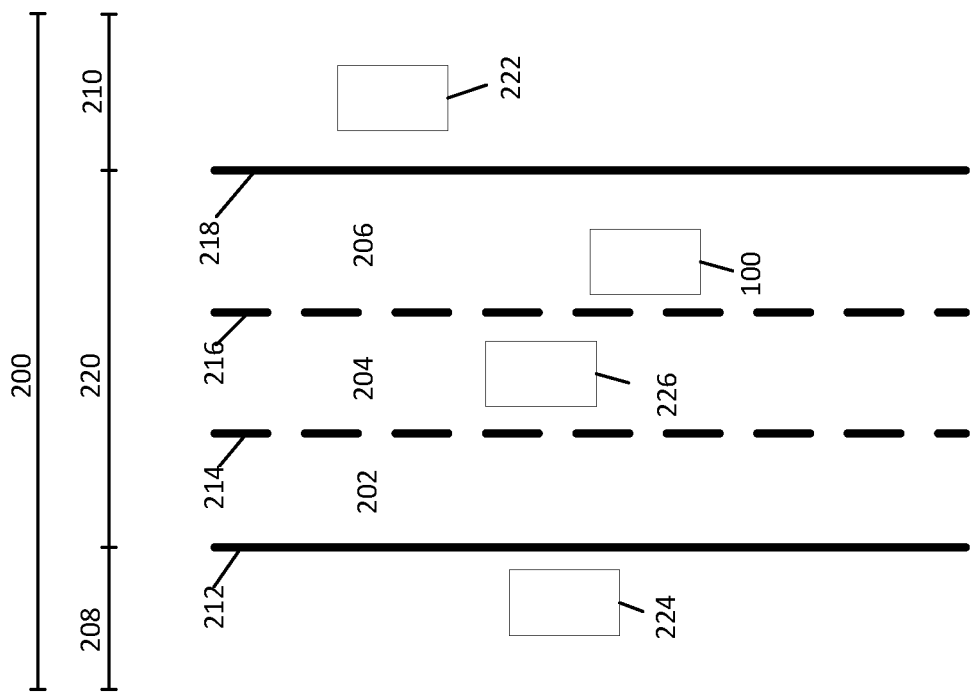
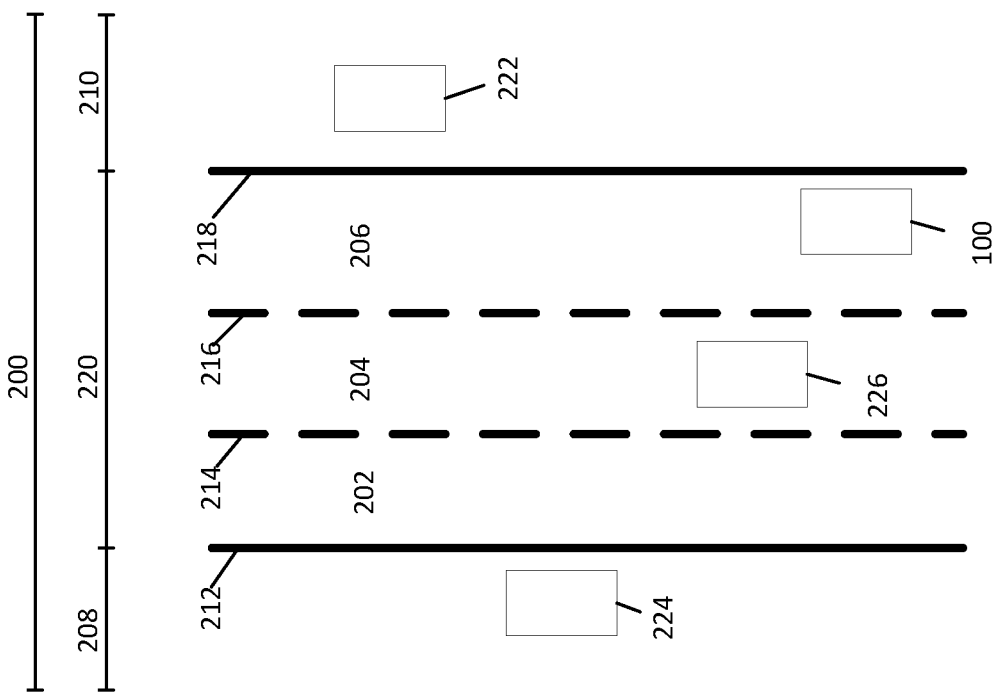

METHODS AND APPARATUS FOR NAVIGATION OF AN AUTONOMOUS VEHICLE BASED ON A LOCATION OF THE AUTONOMOUS VEHICLE RELATIVE TO SHOULDERED OBJECTS

FIELD OF THE DISCLOSURE

In one or more embodiments, an autonomous vehicle processes sensor data to perform a maneuver based on a location of the autonomous vehicle relative to a shouldered object.

BACKGROUND

Drivable areas often include shoulders, where vehicles can pull over. Vehicles parked at shoulders, however, can pose dangers. Thus, in some scenarios, it is desirable for vehicles travelling in a lane next to a shoulder with a parked vehicle to initiate additional maneuvers to mitigate such dangers. In fact, regulations already exist that require vehicles to change lanes or proceed with caution when travelling in a lane adjacent to an object pulled over at a shoulder (e.g., Virginia's "Move Over" law). These rules can apply to smaller-sized vehicles, as well as larger-sized vehicles. Larger-sized vehicles in particular face additional challenges. Due to their larger size and weight, larger-sized vehicles often require more time/distance to safety perform appropriate maneuvers.

BRIEF DESCRIPTION OF THE DRAWINGS

FIG. 1 shows a block diagram of an autonomous vehicle that can detect objects in a shoulder of a road and perform an appropriate maneuver, according to an exemplary embodiment.

FIGS. 3A and 3B shows of scenario of an autonomous vehicle detecting an object in a shoulder, determining that a lane change is not currently feasible, and performing an alternative maneuver, according to an exemplary embodiment.

SUMMARY

Figure 2B:
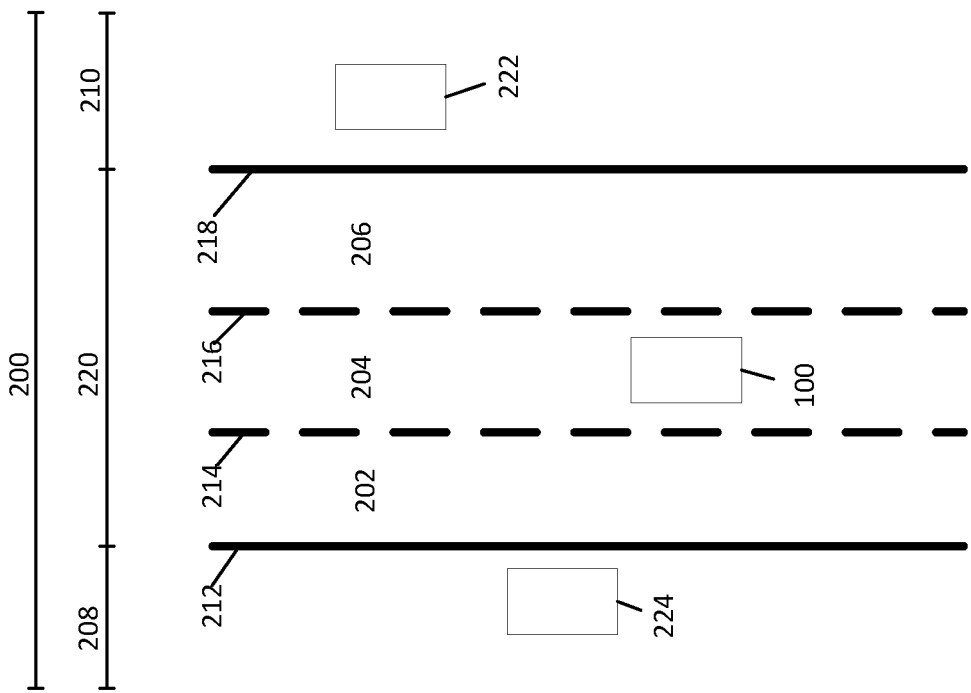
FIGS. 2A and 2B show a scenario of an autonomous vehicle detecting an object in a shoulder and performing a lane change, according to an exemplary embodiment.

In one embodiment, a method, comprises obtaining, by an autonomous vehicle in a lane of a drivable area including at least one shoulder, sensor data using at least one sensor included in the autonomous vehicle, the at least one sensor including at least one of a camera, a radar, or a lidar. The lane is determined to be directly adjacent to the at least one shoulder, the lane directly adjacent to the at least one shoulder along a first side of the lane. An object is detected in front of the autonomous vehicle using an image captured by at least one of the camera, the radar, or the lidar. The object is determined to be one of: (1) in the at least one shoulder of the drivable area, or (2) not in the at least one shoulder of the drivable area. In response to (1) determining that the object is in the at least one shoulder of the drivable area, and (2) determining that performing a lane change maneuver out of the lane prior to the autonomous vehicle being adjacent to the object is feasible, the lane change maneuver is performed. In response to (1) determining that the object is in the at least one shoulder of the drivable area, (2) determining that performing the lane change maneuver is not feasible, and (3) determining that performing a nudge maneuver in the lane prior to the autonomous vehicle being adjacent to the object is feasible, the nudge maneuver is performed. In response to (1) determining that the object is in the at least one shoulder of the drivable area, (2) determining that performing the lane change maneuver is not feasible, (3) determining that performing the nudge maneuver is not feasible, and (4) determining that a speed of the autonomous vehicle is above a predetermined threshold, the autonomous vehicle is decelerated until the speed of the autonomous vehicle is not above the predetermined threshold when the autonomous vehicle is adjacent to the object.

In one embodiment, a method comprises obtaining, by an autonomous vehicle in a lane of a drivable area including at least one shoulder, sensor data using at least one sensor included in the autonomous vehicle. The lane is determined to be directly adjacent to the at least one shoulder, the lane directly adjacent to the at least one shoulder along a first side of the lane. An object located in front of the autonomous vehicle is detected using the sensor data. It is determined whether the object is one of: (1) in the at least one shoulder of the drivable area, or (2) not in the at least one shoulder of the drivable area. In response to (1) determining that the object is in the at least one shoulder of the drivable area, and (2) determining that a lane change maneuver out of the lane prior to the autonomous vehicle being adjacent to the object is feasible, the lane change maneuver is performed. In response to (1) determining that the object is in the at least one shoulder of the drivable area, and (2) determining that the lane change maneuver is not feasible, at least one of (a) a lateral shift of the autonomous vehicle away from the object while remaining within the lane prior to the autonomous vehicle being positioned adjacent to the object, or (b) a deceleration of the autonomous vehicle if a speed of the autonomous vehicle is above a predetermined threshold is performed.

In one embodiment, a non-transitory, machine-readable medium having data recorded thereon for in-situ perception in an autonomous driving vehicle, includes instructions to cause the machine to obtain, by the autonomous vehicle in a lane of a drivable area including at least one shoulder, sensor data using at least one sensor included in the autonomous vehicle. The lane is determined to be directly adjacent to the at least one shoulder along a first side of the lane. An object in front of the autonomous vehicle is identified. The object is determined to be in the at least one shoulder of the drivable area. It is determined whether or not performing a lane change maneuver out of the lane prior to the autonomous vehicle being positioned adjacent to the object is feasible. In response to determining that performing the lane change maneuver is feasible, the lane change maneuver is performed prior to the autonomous vehicle being positioned adjacent to the object. In response to determining that performing the lane change maneuver is not feasible, at least one of (1) a lateral shift of the autonomous vehicle away from the object while remaining within the lane prior to the autonomous vehicle being positioned adjacent to the object, or (2) a deceleration of the autonomous vehicle is performed.

DETAILED DESCRIPTION

An autonomous vehicle driving in a drivable area may detect that the autonomous vehicle is in a lane adjacent to an object in a shoulder. In such a case, it can be desirable to perform a maneuver to reduce the risks associated with driving by such shouldered objects. With the increasing commonality of self-driving vehicles, it is desirable that these self-driving vehicles are able to detect if and what maneuver should be performed. Moreover, additional challenges are posed for self-driving semi-trucks, which often use more time to perform such maneuvers.

Mindful of this, the systems and methods discussed herein are related to detecting an object in a shoulder area in front of an autonomous vehicle (e.g., self-driving semi truck). If it is determined that the autonomous vehicle is approaching the shouldered object, the autonomous vehicle can determine if a lane change is feasible, and if so, perform the lane change. On the other hand, if a lane change is not feasible, the autonomous vehicle can perform a different maneuver, such as a nudge or a deceleration.

FIG. 1 shows a block diagram for an autonomous vehicle 100, according to one embodiment. The autonomous vehicle 100 can be any type of vehicle, such as a car, bus, or semitruck. The autonomous vehicle 100 includes a processor 106 that is operatively coupled to sensor(s) 102, speed/steering controller 108, and memory 110. The processor 106 can be configured to perform (or cause to be performed) any of the techniques discussed herein. For the discussions herein, a "road" can include one or more lanes, and either side of the road can have a shoulder area(s). A "drivable area" refers to any surface that an autonomous vehicle can drive on without causing damage to the autonomous vehicle, such as the road and the shoulder area(s).

The sensor(s) 102 obtains sensor data associated with the autonomous vehicle 100 using at least one sensor (e.g., camera, radar, lidar, global positioning system (GPS)). Although FIG. 1 shows camera 104, it should be understood that sensor(s) 102 can include one or more cameras, one or more radars, one or more lidars or any combination of the same. For example, a radar, a lidar, or camera 104 can capture images (and/or video) of a surrounding of the autonomous vehicle 100, including regions in front of the autonomous vehicle 100. Of course, other types of sensors can be used, as appropriate, to obtain additional sensor data, such as a position sensor to determine a distance between the autonomous vehicle 100 and an object in a surrounding region, a speed sensor to determine a speed of the autonomous vehicle 100 and/or an object in a surrounding region, a location sensor to determine a location of the autonomous vehicle 100, and a network sensor to receive and send information to various compute devices (e.g., nearby vehicles, nearby mobile devices) via a network.

As sensor data associated with the autonomous vehicle 100 and/or the surrounding region of the autonomous vehicle 100 is being captured by the sensor(s) 102 (e.g., images are captured by the camera 104), models 116 in the memory 110 can analyze the sensor data to detect objects/obstacles near the autonomous vehicle 100. For example, the models 116 can use a computer vision model (e.g., a computer vision model that uses a library of programming function such as those in OpenCV) to identify any type of object in an image captured by the camera 104 (or lidar, or radar). Examples of objects to be detected can include one or more of people, animals, cars, trucks, bikes, motorcycles, trees, signs, lane markings, cones, and/or rocks. Additionally, the models 116 can be used to detect features associated with the detected objects. For example, the models 116 can use a computer vision model to identify features associated with the detected objects. Examples of features to be detected can include one or more of a position, speed, size, and/or type associated with the object. Additional discussion related to object/feature detection are discussed in U.S. Pat. No. 11,042,155, the contents of which are incorporated in its entirety herein.

Depending on the size/shape/weight of the autonomous vehicle 100, it can be desirable to detect objects (and optionally, their features) in advance with enough distance/time to perform a maneuver in response to the detection of such objects. The autonomous vehicle 100 can be, for example, a medium truck, heavy truck, very heavy truck, greater than 14,000 pounds, greater than 26,000 pounds, greater than 70,000 pounds, or greater than 80,000 pounds.

To ensure that larger vehicles have enough time/distance to perform appropriate maneuvers, the objects can be detected well in advance. In one or more implementations, the object can be detected well in advance using long range sensors (e.g., long range radar sensor) included in the sensor(s) 102. In one or more implementations, a separate compute device can detect the object and share any relevant information (e.g., location of object, attributes of object) to the autonomous vehicle 100 via a network. For instance, a signal can be received from a shouldered object itself, from an aerial vehicle scanning a drivable area from the sky and detecting the shouldered object, or a server running a computer vision model analyzing traffic camera footage of an area in front of the autonomous vehicle 100. For example, in some implementations, objects can be detected at a distance greater than at least one of: 60 meters in front of the autonomous vehicle 100, 75 meters in front of the autonomous vehicle 100, 150 meters in front of the autonomous vehicle 100, 200 meters in front of the autonomous vehicle 100, 250 meters in front of the autonomous vehicle 100, or 300 meters in front of the autonomous vehicle 100.

The map database 114 is stored in the memory 110 and can include information associated with the drivable area that the autonomous vehicle 100 is currently travelling on and/or will be travelling on (e.g., TomTom ADAS map, TomTom HD map). The map database 114 can include, for example, information about how many lanes a road has, the width of each lane, speed limits, road conditions, curvature of the road, gradient of the road, lane divider types, and/or the like.

Although not shown in the example illustration of FIG. 1, in some implementations, the map database 114 and/or models 116 can be stored at a separate compute device (e.g., computer, server) with a connection to a network, and can exchange data with the autonomous vehicle 100 via the network. The network can be, for example, a wireless network(s) or a combination of a wireless network(s) and wired networks.

The models 116 and/or map database 114 can be used to detect shoulders in a drivable area, objects in a shoulder, and/or associated attributes of the object in the shoulder (e.g., location of object in shoulder, speed of object in shoulder) based on the sensor data. There are many ways to detect objects in a shoulder area. For the sake of brevity, a few potential techniques will be discussed, though it can be appreciated that additional or alternative techniques can be used.

In one implementation, the models 116 can detect a shoulder by analyzing lane markings (e.g., lane patterns, lane markers, lane dividers) in images captured by at least one of the camera 104, a radar, or a lidar. For example, for roads defined by a first solid line (i.e., left solid line, for example left of the lane having oncoming traffic) and a second solid line (i.e., right solid line, for example right of the lane having the autonomous vehicle) to the right of the first solid line, areas to the left of the first solid line and to the right of the second solid line define shoulder areas. Upon identifying the second solid line, a determination can be made as to whether any objects are to the right of the second solid line. Of course, such a scenario would apply for roads where driving forward is performed on the right side of the road. If driving forward is performed on the left side of the road, an object would be in the shoulder area if it is detected to the left of the first solid line. Hereinafter, for the sake of simplicity, the embodiments herein will be discussed under the assumption that vehicles drive forward on the right side of the road, though it can be appreciated that the techniques discussed herein can be modified to accommodate scenarios where vehicles drive forward on the left side of the road.

In one or more implementations, the models 116 can determine a first lateral distance between the autonomous vehicle 100 and the shoulder, and a second lateral distance between the autonomous vehicle 100 and the object. If the second lateral distance is within a predetermined range relative to the first lateral distance (e.g., 1-5 feet larger than the first lateral distance), the object can be labelled as being on the shoulder. If the lateral distance is not within the predetermined range, the object would not be labelled as being on the shoulder.

As an example, the autonomous vehicle 100 can drive in the exact middle of a middle lane in a three lane road, where each lane is 12 feet wide and the autonomous vehicle 100 is 6 feet wide. Thus, the (shortest) distance from the left side of the autonomous vehicle 100 to the left side boundary of the road is 15 feet (12 feet from the left lane plus 3 feet between the left middle lane boundary and the left side of the autonomous vehicle 100), and the (shortest) distance from the right side of the autonomous vehicle 100 to the right side boundary of the road is 15 feet (12 feet from the right lane plus 3 feet between the right middle lane boundary and the right side of the autonomous vehicle 100). If a distance and angle measurement of an object indicates that the object is laterally positioned within a predetermined range (e.g., 16-20 feet) to the left or right relative to the autonomous vehicle 100, it can be marked as being in the shoulder, while any object outside the predetermined range (e.g., less than 16 feet or greater than 20) is not.

In one implementation, a machine learning based classifier can be used to directly output whether a detected object is in the shoulder. For example, a convolutional neural network can be trained to take various images of drivable areas with a right shoulder and an object in the right shoulder, drivable areas with a right shoulder and no object in the right shoulder, and drivable areas without a right shoulder as input, to output whether the image is of a drivable area with a right shoulder and an object in the right shoulder.

In addition, the autonomous vehicle 100 can determine if it is travelling in a lane adjacent to the shoulder (i.e., the lane next to the shoulder). This can be accomplished in a variety of ways. For example, the models 116 can determine from analyzing the sensor data that the autonomous vehicle 100 is in the rightmost lane by analyzing the lane markers of the lane that the autonomous vehicle 100 is driving in. If the left lane marker indicates another lane is available to the left of the left lane marker (e.g., dashed line), and the right lane marker indicates that another lane is not available to the right side of the right lane marker (e.g., solid line), a determination can be made that the autonomous vehicle 100 is in the right-most lane. Thus, if an object is determined to be in a shoulder area to the right of the right-most lane that the autonomous vehicle is travelling in, a determination can be made that the autonomous vehicle 100 is travelling in a lane adjacent to the shoulder/object.

As another example, a location sensor can determine location coordinates of the autonomous vehicle 100, and the map database 114 can use those location coordinates to determine if they identify a lane next to the shoulder.

If the autonomous vehicle 100 has determined that it is in the right-most lane, and that an object is present in a shoulder area next to the right-most lane, a determination can be made as to how much time and/or distance remains (i.e., remaining time value, remaining distance value) until the autonomous vehicle 100 is directly adjacent to (i.e., next to) the object. In some implementations, this determination can be done by determining a distance between the autonomous vehicle 100 and the object in the shoulder (e.g., using the sensor(s) 102, map database 114, and/or models 116) and determining a speed of the autonomous vehicle 100 relative to the object in the shoulder (e.g., using the sensor(s) 102, map database 114, and/or models 116). This distance and speed information can be used to predict how much time and/or distance remains. In one implementation, sensor(s) 102 can determine the autonomous vehicle's 100 location in terms of GPS coordinates, and the object's location relative to the autonomous vehicle 100 in terms of a distance and angle value. Thereafter, using the map database 114 to determine the layout of the road between the autonomous vehicle's 100 location and the object's location, it can be predicted the path that the autonomous vehicle 100 will take. From there, the distance of the predicted path can be determined using the map database 114 to generate a (predicted) remaining distance value. Assuming the autonomous vehicle 100 is reducing the distance from the object, a (predicted) remaining time value can be generated by dividing the remaining distance value by a difference in speed between the autonomous vehicle 100 and object. In some implementations, the remaining time and distance values can be increased slightly (e.g., by 10%, by 20%) to account for variability (e.g., speed fluctuations, sensor measurement variability). In scenarios where the object is moving away from the autonomous vehicle faster than the autonomous vehicle is moving towards the object, calculating a remaining time and/or remaining distance value can be optional, or the calculated reaming time/distance value can represent that the autonomous vehicle 100 is not closing in the on object (e.g., "N/A", "infinity").

In scenarios where the autonomous vehicle 100 is closing in on the object, the object is in a shoulder area, and the autonomous vehicle 100 is in the lane adjacent to the shoulder area, the autonomous vehicle 100 can perform a steering maneuver via the speed/steering controller 108, described further herein. The speed/steering controller 108 controls movement of the autonomous vehicle 100, such as speeding up, slowing down, moving forward, moving backward, and turning.

If it is determined that there is a lane to the left of the right-most lane, there is room for the autonomous vehicle 100 to merge into that left lane prior to the calculated remaining time and/or distance being zero, and switching into the left lane wouldn't cause the autonomous vehicle 100 to be next to a different shouldered object, the speed/steering controller 108 can navigate the autonomous vehicle 100 left into the lane adjacent to the right-most lane, thereby creating a one-lane buffer between the autonomous vehicle 100 and shouldered object.

If switching lanes is not feasible (e.g., no additional lane exists, there is an obstacle in the way, there is not enough remaining time/distance, a more preferable navigation is possible, switching lanes would position the autonomous vehicle 100 next to an object in the opposite shoulder), an alternative is to perform a nudge maneuver, where the autonomous vehicle 100 remains within the same lane, but laterally positions itself to the left portion of the lane to create more distance between the autonomous vehicle 100 and the object, while remaining within its current lane. This repositioning can be performed prior to the autonomous vehicle 100 being adjacent to the object. As one example, if the autonomous vehicle 100 is driving in the right-most lane, and the left side of the autonomous vehicle 100 has three feet of space between itself and the left boundary of the right-most lane, the speed/steering controller 108 can navigate the autonomous two feet to the left.

The nudge maneuver can be feasible if there is room in the lane for the autonomous vehicle 100 to laterally reposition itself away from the shouldered object while maintaining a lateral distance between the autonomous vehicle 100 and one or more boundaries (e.g., lane divider, an adjacent vehicle) above a predetermined threshold (e.g., one foot). If the autonomous vehicle is already at or below the predetermined threshold, a nudge maneuver may not be feasible.

Another alternative is for the autonomous vehicle 100 to slow down. If the autonomous vehicle 100 is travelling at a speed above a predefined threshold (e.g., greater than 60 miles per hour; more than double the speed of the object), the speed/steering controller 108 can cause the autonomous vehicle 100 to decelerate. In some implementations, the rate of deceleration can be such that the speed of the autonomous vehicle 100 is below the predefined threshold by the time the autonomous vehicle 100 is next to the object. In situations where the rate of deceleration is too abrupt, the autonomous vehicle 100 can decelerate up to a predefined, maximum deceleration rate. Although the autonomous vehicle 100 at the decelerated speed may be travelling at a speed that is still higher than the predefined threshold, such a situation may be preferable over the autonomous vehicle 100 travelling at its original speed when passing by the object 222. To compensate, additional actions can be taken by the autonomous vehicle 100, such as sending an audible (e.g., honking) or visual (e.g., flashing headlights) warning towards the object.

In some implementations, at any point after detecting an object at a shoulder, a visual warning and/or an audio warning can be output to a passenger (e.g., driver) of the autonomous vehicle 100 via an output device (not shown) such as a display (or a warning light) or a speaker disposed within the autonomous vehicle 100. The visual and/or audio warning can serve to alert the passenger that an object is at a shoulder, an approximate location of the object at the shoulder, any actions the passenger is recommended to take, etc.

In one or more embodiments, the three maneuvers discussed above (i.e., performing a lane change maneuver, performing a nudge maneuver, decelerating) can be ranked according to priority such that the speed/steering controller 108 will attempt to perform the highest-preferred maneuver first, the middle-preferred maneuver if the highest-preferred maneuver is not feasible, and the lowest-preferred maneuver if the highest-preferred and middle-preferred maneuvers are not feasible. Any of the three maneuvers can be ranked as the highest-preferred, middle-preferred, or lowest-preferred maneuvers. Feasible can refer to if the maneuver can be completed prior to the autonomous vehicle 100 being adjacent to the object. Alternatively, feasible can refer to if the maneuver can be completed by the time the autonomous vehicle 100 is adjacent to the object.

In one or more embodiments, the highest-preferred maneuver is performing a lane change maneuver, the middle-preferred maneuver is performing a nudge maneuver, and the lowest-preferred maneuver is decelerating. In other embodiments, the highest-preferred maneuver is performing a lane change maneuver, the middle-preferred maneuver is decelerating, and the lowest-preferred maneuver is performing a nudge maneuver. In some implementations, where the highest-, middle-, and lowest-preferred maneuver are not performed and/or cannot be performed, at least one of a visual or audio warning can be provided to a passenger (e.g., driver) in the autonomous vehicle 100.

In one or more embodiments, multiple maneuvers can be performed together. For example, a lane changing maneuver and deceleration can both be performed. As another example, a nudge maneuver and deceleration can both be performed.

FIGS. 2A, 2B, 3A, and 3B shows examples of scenarios to further illustrate the concepts discussed herein. The scenarios include the autonomous vehicle 100 travelling in a drivable area to facilitate additional discussions related to the autonomous vehicle 100 performing one or more appropriate maneuvers in response to detecting one or more shouldered objects.

Figure 2A:
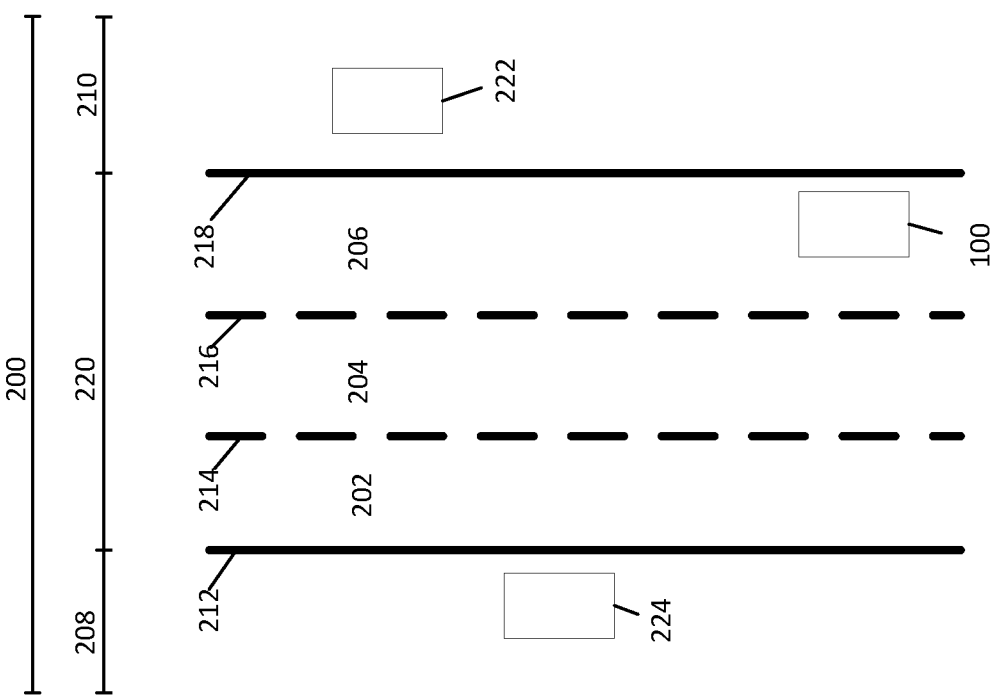

FIG. 2A shows a drivable area 200, which includes a road 220, a left shoulder 208, and a right shoulder 210. The road 220 includes a left lane 202, a middle lane 204, and a right lane 206, where the direction of travel in each lane 202, 204, 206 is from bottom to top. The left shoulder 208 is to the left of the left solid line 212, the left lane 202 is to the right of the left solid line 212 and to the left of the left dashed line 214, the middle lane 204 is to the right of the left dashed line 214 and to the left of the right dashed line 216, the right lane 206 is to the right of the right dashed line 216 and to the left of the right solid line 218, and the right shoulder 210 is to the right of the right solid line 218.

The autonomous vehicle 100 is travelling in the right lane 206. On the left shoulder 208 is a stationary obstacle 224, and on the right shoulder is a stationary obstacle 222. The sensor(s) 102 of the autonomous vehicle 100 generates sensor data associated with the surrounding. The models 116 recognize the left shoulder 208 and right shoulder 210 by detecting the left solid line 212 and right solid line 218. The models 116 also determine that the autonomous vehicle 100 is in the right lane 206 by identifying the right dashed line 216 and the right solid line 218 to the right of the right dashed line 216. Using the sensor data obtained by the sensor(s) 102, the models 116 recognize that the autonomous vehicle 100 is travelling in a lane adjacent to a shoulder with an object (i.e., shoulder 210 with object 222). The models 116 can also detect object 224, but recognize that the left lane 202 and middle lane 204 are buffers (intervening lanes) between the autonomous vehicle 100 and object 224. The models 116 can then determine how much time and/or distance remains before the autonomous vehicle 100 is adjacent to the object 222.

A determination can then be made by the autonomous vehicle 100 as to whether a lane change to the middle lane 204 is feasible. The models 116 recognize the existence of the middle lane, that there is no obstacle (e.g., car) in the middle lane 204 within a relevant distance, that there is enough time/distance to perform a lane change maneuver, and that switching into the middle lane 204 still leaves the left lane 202 to act as a buffer to the object 224 in the left shoulder 212. Upon determining that performing the lane change maneuver is feasible, the autonomous vehicle 100 moves into the middle lane 204, as shown in FIG. 2B.

FIG. 3A is similar to FIG. 2A, except with the addition of the obstacle 226, which is travelling forward with a speed equal to that of the autonomous vehicle 100. The models 116 detect the presence of the object 222 in the right shoulder 210, and that the autonomous vehicle 100 is in the right lane 206, but also recognize that the obstacle 226 would make performing a lane change maneuver unsafe (i.e., not feasible).

Thus, in some instances (given the scenario shown in FIG. 3A), the autonomous vehicle 100 can slow down such that its speed is below a predefined threshold (not shown in FIG. 3A or 3B). For example, if the predefined threshold is 10% less than the speed limit, the map database 114 can provide an indication of the speed limit to the processor 106, and the speed/steering controller 108 can decelerate the autonomous vehicle 100 so that its speed is approximately 10% less than the speed limit.

FIG. 3B shows another potential scenario that can occur in response to the scenario shown in FIG. 3A. In some instances, as shown in FIG. 3B, the autonomous vehicle 100 can perform a nudge maneuver. As can be seen, the autonomous vehicle 100 can laterally position itself closer to the right dashed line 216 and further from the right solid line 218, while remaining within the right lane 206 and travelling at the same speed. The distance between the autonomous vehicle 100 and right dashed line 216 can remain above a predetermined threshold, such as for example 10% of the right lane's 206 total width.

In some implementations, a nudge maneuver can also be accompanied with a deceleration. In some implementations, the autonomous vehicle 100 can decelerate slightly to create room in the middle lane 204 between itself and the obstacle 226. Thereafter, a lane change maneuver can be performed.

Figure 4:
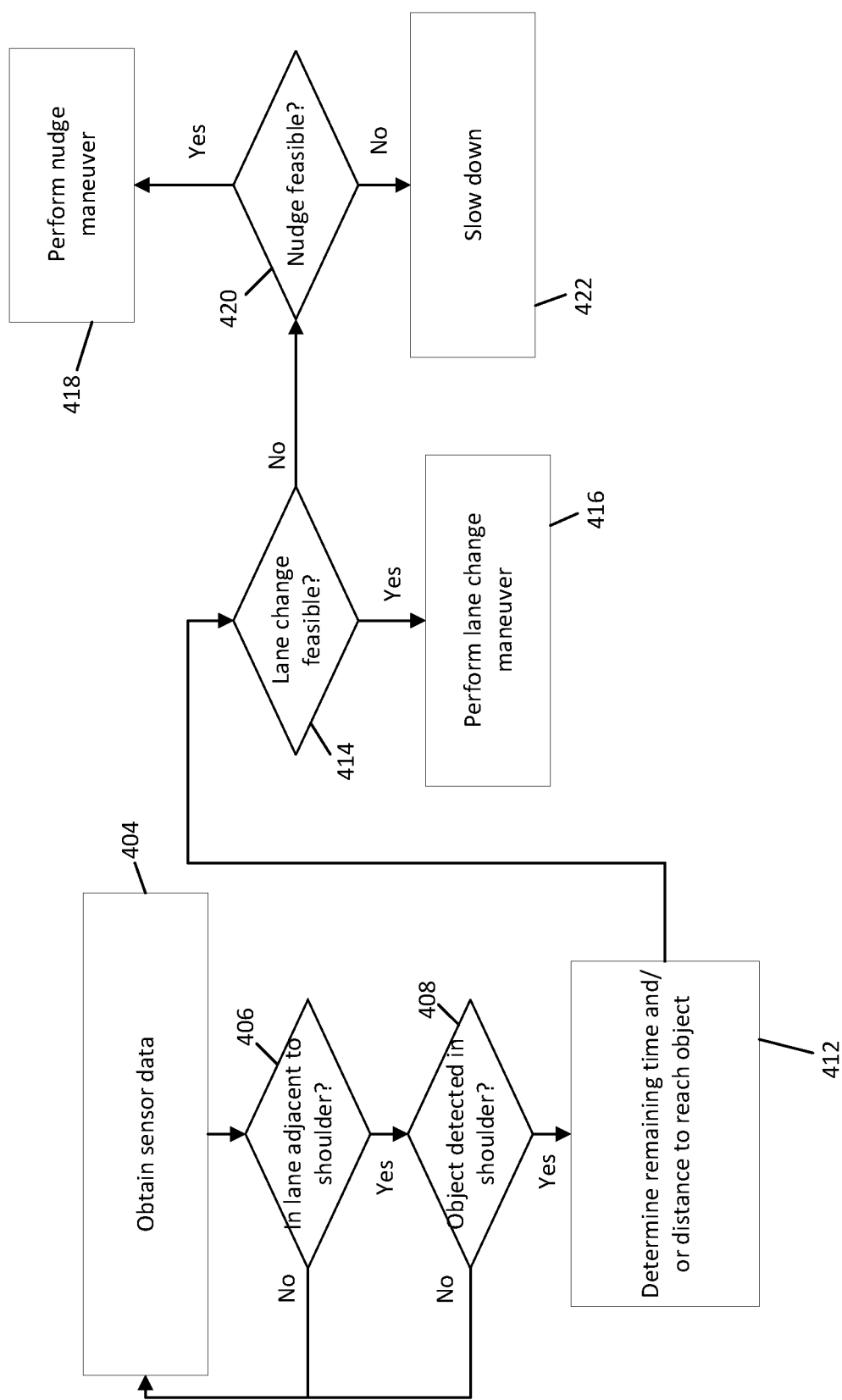
FIG. 4 shows a flowchart of a method for detecting an object in a shoulder and performing an appropriate maneuver, according to an exemplary embodiment.

FIG. 4 shows a flowchart of a method for performing a maneuver in response to detecting an object in a shoulder area, according to an embodiment. The method discussed with respect to FIG. 4, portions thereof, and/or obvious variations thereof, can be performed automatically (i.e., not in response to human input, without human control), manually (i.e., in response to human input), or a combination of automatically and manually.

At 404, sensor data is gathered (received, obtained, detected) using at least one sensor included in an autonomous vehicle (e.g., autonomous vehicle 100). The sensor data can represent features of a surrounding of the autonomous vehicle, including regions in front of the autonomous vehicle. The sensor data can also represent features of the autonomous vehicle itself, such as its location and speed. Examples of sensors include a camera, radar, lidar, GPS, and communication sensor.

At 406, determine if the autonomous vehicle is in a lane adjacent to a shoulder. This can be performed in a variety of ways, some of which were discussed previously. For example, the autonomous vehicle can determine that it is in a lane adjacent to a shoulder if a left lane marker of the lane is a dashed line and a right lane marker of the lane is a solid line. If the lane is determined to not be adjacent to a shoulder, return to 404. If the lane is determined to be adjacent to a shoulder, proceed to 408.

At 408, determine if an object is detected in the shoulder using, at least partially, the sensor data from 404. In other words, determine whether the object is in a shoulder of a drivable area or not in a shoulder of the drivable area. Objects (and features thereof) can be detected by analyzing the sensor data from 404 using object detection models (e.g., models 116). The object can be determined to be in the shoulder using a variety of techniques, such as analyzing lane dividers, determining a distance/angle between the autonomous vehicle to the object and comparing the lateral distance to known information about the drivable area, using a machine leaning model, or a combination thereof. If an object is not detected in the shoulder (i.e., the object is determined to not be in the shoulder), return to 404. If an object is detected in the shoulder (i.e., the object is determined to be in the shoulder), proceed to 412.

Assuming the autonomous vehicle 100 is closing in on the object, at 412, determine a remaining time and/or remaining distance until the autonomous vehicle is next to the object detected at 408 using the sensor data obtained in 404.

At 414, determine if a lane change maneuver is feasible. It is feasible if there is a lane to change to, there isn't an obstacle in the way (e.g., no adjacent vehicle next to the autonomous vehicle in the target lane), the lane change can be performed prior to the remaining time/distance being zero, and the lane being changed to wouldn't cause the autonomous vehicle to be next to an object in the opposite shoulder. If the lane change maneuver is determined to be feasible, perform the lane change maneuver at 416. If the lane change maneuver is not determined to be feasible, proceed to 420.

At 420, determine if a nudge maneuver is feasible. It is feasible if there is room in the current lane of the autonomous vehicle for it to laterally position itself further away from the object while maintaining a lateral distance between a predetermined boundary (e.g., lane marker) above a predefined threshold prior to the autonomous vehicle being next to the object. If the nudge maneuver is determined to be feasible, perform the nudge maneuver at 418. If the nudge maneuver is not determined to be feasible, proceed to 422.

At 422, slow the autonomous vehicle down. If there is a maximum speed that the autonomous vehicle can drive by the object, the autonomous vehicle can be controlled to drive below that maximum speed. If the autonomous vehicle needs to decelerate too abruptly to decrease its speed to be below the maximum speed, the autonomous vehicle can slow itself down as fast as possible while not decelerating at a rate faster than predetermined as safe. Such a maximum deceleration rate can be determined based on factors such as a speed of the autonomous vehicle, a size of the autonomous vehicle, a weight of the autonomous vehicle, a weight of a load that the autonomous vehicle is hauling, a type of the load that the autonomous vehicle is hauling (e.g., liquid, solid), weather conditions (e.g., icy, wet, dry), material of the road (dirt, gravel, concrete), angle of the road (e.g., uphill, downhill), a distance between the autonomous vehicle and another vehicle behind the autonomous vehicle, and/or a speed of the autonomous vehicle relative to another vehicle behind the autonomous vehicle. The maximum deceleration rate can be higher in certain scenarios (e.g., travelling slow, dry road, concrete road, no vehicles nearby the autonomous vehicle, no load), and lower in other scenarios (e.g., travelling at high speed, wet road, icy road, dirt road, hauling a load, tailgating vehicle nearby). In some implementation, the maximum declaration rate can be 5 feet per second (fps), 10 fps, 15 fps, or 20 fps.

In some embodiments, a method comprises: obtaining, by an autonomous vehicle in a lane of a drivable area including at least one shoulder, sensor data using at least one sensor included in the autonomous vehicle, the at least one sensor including at least one of a camera, a radar, or a lidar; determining that the lane is directly adjacent to the at least one shoulder, the lane directly adjacent to the at least one shoulder along a first side of the lane; detecting an object in front of the autonomous vehicle using an image captured by at least one of the camera, the radar, or the lidar; determining whether the object is one of: (1) in the at least one shoulder of the drivable area, or (2) not in the at least one shoulder of the drivable area; in response to (1) determining that the object is in the at least one shoulder of the drivable area, and (2) determining that performing a lane change maneuver out of the lane prior to the autonomous vehicle being adjacent to the object is feasible, performing the lane change maneuver; in response to (1) determining that the object is in the at least one shoulder of the drivable area, (2) determining that performing the lane change maneuver is not feasible, and (3) determining that performing a nudge maneuver in the lane prior to the autonomous vehicle being adjacent to the object is feasible, performing the nudge maneuver; and in response to (1) determining that the object is in the at least one shoulder of the drivable area, (2) determining that performing the lane change maneuver is not feasible, (3) determining that performing the nudge maneuver is not feasible, and (4) determining that a speed of the autonomous vehicle is above a predetermined threshold, decelerating the autonomous vehicle until the speed of the autonomous vehicle is not above the predetermined threshold when the autonomous vehicle is adjacent to the object.

In some implementations, the lane is separated from the at least one shoulder via a lane marker, and the object is determined to be in the at least one shoulder of the drivable area during the determining of the object as one of: (1) in the at least one shoulder of the drivable area, or (2) not in the at least one shoulder of the drivable area if analysis of the sensor data indicates that the object is located on the first side of the lane marker.

In some implementations, the lane is a first lane, and performing the lane change maneuver is feasible when a second lane located adjacent to the first lane along a second side opposite from the first side exists, and an obstacle would not be present in the second lane along the second side of the autonomous vehicle as the lane change maneuver is performed.

Some implementations, wherein the sensor data includes a representation of a position of the object and a speed of the object, further comprise: predicting at least one of a remaining time value or a remaining distance value until the autonomous vehicle is adjacent to the object using the position of the object and the speed of the object, at least one of the lane change maneuver, the nudge maneuver, or the decelerating being performed prior to at least one of the remaining time value or the remaining distance value being zero.

Some implementations further comprise: in response to the determining that the lane change maneuver is not feasible, determining a lateral distance between the autonomous vehicle and a second side of the lane, the second side of the lane opposite from the first side of the lane; and in response to the lateral distance being above a predefined threshold, performing the nudge maneuver, the lateral distance after the performing of the nudge maneuver being not below the predefined threshold; and in response to the lateral distance not being above the predefined threshold, performing the decelerating.

In some implementations, the autonomous vehicle is a heavy truck.

In some implementations, the detecting of the object is performed prior to the autonomous vehicle being within 75 meters of the object.

In some embodiments, a method comprises: obtaining, by an autonomous vehicle in a lane of a drivable area including at least one shoulder, sensor data using at least one sensor included in the autonomous vehicle; determining that the lane is directly adjacent to the at least one shoulder, the lane directly adjacent to the at least one shoulder along a first side of the lane; detecting an object located in front of the autonomous vehicle using the sensor data; determining whether the object is one of: (1) in the at least one shoulder of the drivable area, or (2) not in the at least one shoulder of the drivable area; in response to (1) determining that the object is in the at least one shoulder of the drivable area, and (2) determining that a lane change maneuver out of the lane prior to the autonomous vehicle being adjacent to the object is feasible, performing the lane change maneuver; and in response to (1) determining that the object is in the at least one shoulder of the drivable area, and (2) determining that the lane change maneuver is not feasible, performing at least one of (a) a lateral shift of the autonomous vehicle away from the object while remaining within the lane prior to the autonomous vehicle being positioned adjacent to the object, or (b) a deceleration of the autonomous vehicle if a speed of the autonomous vehicle is above a predetermined threshold.

In some implementations, the determining of the object as one of: (1) in the at least one shoulder of the drivable area, or (2) not in the at least one shoulder of the drivable area is performed by a convolutional neural network using the sensor data.

Some implementations further comprise determining a position of the object using the sensor data; and predicting at least one of a remaining time value or a remaining distance value until the autonomous vehicle is adjacent to the object based on the position of the object, wherein at least one of the lane change maneuver, the nudge maneuver, or the decelerating is performed prior to at least one of the remaining time value or the remaining distance value being zero.

Some implementations further comprise: determining a first lateral distance between the autonomous vehicle and the object; determining a second lateral distance between the autonomous vehicle and the at least one shoulder; in response to the first lateral distance being within a predefined range relative to the second lateral distance, determining that the object is in the at least one shoulder of the drivable area; and in response to the first lateral distance not being within the predefined range relative to the second lateral distance, determining that the object is not in the at least one shoulder of the drivable area.

Some implementations further comprise in response to (1) the lateral shift of the autonomous vehicle away from the object while remaining within the lane prior to the autonomous vehicle being positioned adjacent to the object not being feasible, and (2) a deceleration rate used to perform the deceleration of the autonomous vehicle until the speed of the autonomous vehicle is below the predetermined threshold when the autonomous vehicle is positioned adjacent to the object is above a predetermined maximum deceleration rate, decelerating the autonomous vehicle at the predetermined maximum deceleration rate.

Some implementations further comprise transmitting at least one of a visual or audible signal towards the object.

In some implementations, the determining of the object as one of: (1) in the at least one shoulder of the drivable area, or (2) not in the at least one shoulder of the drivable area is performed prior to the autonomous vehicle being within 150 meters of the object.

In some embodiments, a non-transitory, machine-readable medium has data recorded thereon for in-situ perception in an autonomous driving vehicle, including instructions to cause the machine to: obtain, by an autonomous vehicle in a lane of a drivable area including at least one shoulder, sensor data using at least one sensor included in the autonomous vehicle; determine that the lane is directly adjacent to the at least one shoulder along a first side of the lane; identify an object in front of the autonomous vehicle; determine that the object is in the at least one shoulder of the drivable area; determine whether or not performing a lane change maneuver out of the lane prior to the autonomous vehicle being positioned adjacent to the object is feasible; in response to determining that performing the lane change maneuver is feasible, performing the lane change maneuver prior to the autonomous vehicle being positioned adjacent to the object; and in response to determining that performing the lane change maneuver is not feasible, performing at least one of (1) a lateral shift of the autonomous vehicle away from the object while remaining within the lane prior to the autonomous vehicle being positioned adjacent to the object, or (2) a deceleration of the autonomous vehicle.

In some implementations, the instructions further include instructions to: identify at least one of a position or a speed of the object relative to the autonomous vehicle to determine a maximum amount of time the autonomous vehicle has prior to the autonomous vehicle being positioned adjacent to the object.

In some implementations, the sensor data includes a representation of a position of the object and a speed of the object; and the instructions further include instructions to: determine at least one of a remaining time value or a remaining distance value until the autonomous vehicle is adjacent to the object based the position of the object and the speed of the object, wherein the lane is a first lane, and the performing of the lane change maneuver is feasible when (1) a second lane located adjacent to the first lane along a second side opposite from the first side exists, (2) an obstacle would not be present in the second lane along the second side of the autonomous vehicle as the lane change maneuver is performed, and (3) the lane change maneuver can be completed prior to at least one of the remaining distance value or the remaining time value being zero.

In some implementations, the sensor data includes image data, the image data includes a representation of the object, and the object is identified from the representation of the object using computer vision.

In some implementations, the instructions further comprises instructions to: cause at least one of an audio warning or a visual warning to be output to at least one of a driver or a passenger inside the autonomous vehicle after determining that the object is in the at least one shoulder of the drivable area.

In some implementations, the autonomous vehicle weights at least 26,000 pounds.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the Figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method comprising:
obtaining, by a vehicle in a lane of a drivable area including at least one shoulder, sensor data using at least one sensor included in the vehicle, the at least one sensor including at least one of a camera, a radar, or a lidar;
determining that the lane is directly adjacent to the at least one shoulder, the lane directly adjacent to the at least one shoulder along a first side of the lane;
detecting an object in front of the vehicle using an image captured by at least one of the camera, the radar, or the lidar;
determining whether the object is in the at least one shoulder of the drivable area;
in response to (1) determining that the object is in the at least one shoulder of the drivable area, and (2) determining that performing a lane change maneuver out of the lane prior to the vehicle being adjacent to the object is feasible, performing the lane change maneuver;
in response to (1) determining that the object is in the at least one shoulder of the drivable area, (2) determining that performing the lane change maneuver is not feasible, and (3) determining that performing a nudge maneuver in the lane prior to the vehicle being adjacent to the object is feasible, performing the nudge maneuver; and
in response to (1) determining that the object is in the at least one shoulder of the drivable area, (2) determining that performing the lane change maneuver is not feasible, (3) determining that performing the nudge maneuver is not feasible, and (4) determining that a speed of the vehicle is above a predetermined threshold, decelerating the vehicle until the speed of the vehicle is not above the predetermined threshold when the vehicle is adjacent to the object.

2. The method of claim 1, wherein the lane is separated from the at least one shoulder via a lane marker, and the object is determined to be in the at least one shoulder of the drivable area during the determining of the object as in the at least one shoulder of the drivable area if analysis of the sensor data indicates that the object is located on a first side of the lane marker.

3. The method of claim 1, wherein:
the lane is a first lane, and
performing the lane change maneuver is feasible when a second lane located adjacent to the first lane along a second side of the first lane opposite from the first side of the first lane exists, and an obstacle would not be present in the second lane along the vehicle as the lane change maneuver is performed.

4. The method of claim 1, wherein the sensor data includes a representation of a position of the object and a speed of the object, the method further comprising:
predicting at least one of a remaining time value or a remaining distance value until the vehicle is adjacent to the object using the position of the object and the speed of the object, at least one of the lane change maneuver, the nudge maneuver, or the decelerating being performed prior to at least one of the remaining time value or the remaining distance value being zero.

5. The method of claim 1, further comprising:
in response to the determining that the lane change maneuver is not feasible, determining a lateral distance between the vehicle and a second side of the lane, the second side of the lane opposite from the first side of the lane; and
in response to the lateral distance being above a predefined threshold, performing the nudge maneuver, the lateral distance after the performing of the nudge maneuver being not below the predefined threshold; and
in response to the lateral distance not being above the predefined threshold, performing the decelerating.

6. The method of claim 1, wherein the vehicle is a heavy truck.

7. The method of claim 1, wherein the detecting of the object is performed prior to the vehicle being within 75 meters of the object.

8. An apparatus, further comprising:
at least one sensor;
a processor operably coupled to the at least one sensor; and
a memory operably coupled to the processor, the memory storing instructions that when executed cause the processor to:
obtain, by a vehicle in a lane of drivable area including at least one shoulder, sensor data using the at least one sensor included in the vehicle;
determine that the lane is directly adjacent to the at least one shoulder, the lane directly adjacent to the at least one shoulder along a first side of the lane;
detect an object located in front of the vehicle using the sensor data;
determine whether the object is in the at least one shoulder of the drivable area;
in response to (1) determining that the object is in the at least one shoulder of the drivable area, and (2) determining that a lane change maneuver out of the lane prior to the vehicle being adjacent to the object is feasible, perform the lane change maneuver; and
in response to (1) determining that the object is in the at least one shoulder of the drivable area, and (2)

determining that the lane change maneuver is not feasible, perform at least one of (a) a lateral shift of the vehicle away from the object while remaining within the lane prior to the vehicle being positioned adjacent to the object, or (b) a deceleration of the vehicle if a speed of the vehicle is above a predetermined threshold.

9. The apparatus of claim 8, wherein the determining of the object in the at least one shoulder of the drivable area, is performed by a convolutional neural network using the sensor data.

10. The apparatus of claim 8, wherein the memory further stores instructions that when executed cause the processor to:
  determine a position of the object using the sensor data;
  predict at least one of a remaining time value or a remaining distance value until the vehicle is adjacent to the object based on the position of the object, wherein at least one of the lane change maneuver, the nudge maneuver, or the decelerating is performed prior to at least one of the remaining time value or the remaining distance value being zero.

11. The apparatus of claim 8, wherein the memory further stores instructions that when executed cause the processor to:
  determine a first lateral distance between the vehicle and the object;
  determine a second lateral distance between the vehicle and the at least one shoulder;
  in response to the first lateral distance being within a predefined range relative to the second lateral distance, determine that the object is in the at least one shoulder of the drivable area; and
  in response to the first lateral distance not being within a predefined range relative to the second lateral distance, determine that the object is not in the at least one shoulder of the drivable area.

12. The apparatus of claim 11, wherein the memory further stores instructions that when executed cause the processor to:
  in response to (1) the lateral shift of the vehicle away from the object while remaining within the lane prior to the vehicle being positioned adjacent to the object not being feasible, and (2) a deceleration rate used to perform the deceleration rate of the vehicle until the speed of the vehicle is below the predetermined threshold when the vehicle is positioned adjacent to the object is above the predetermined maximum deceleration rate.

13. The apparatus of claim 12, wherein the memory further stores instructions that when executed cause the processor to:
  transmit at least one of a visual or audible signal towards the object.

14. The apparatus of claim 8, wherein the instruction to determine includes an instruction to determine the object in the at least one shoulder of the drivable area is performed prior to the vehicle being within 150 meters of the object.

15. The non-transitory, machine-readable medium having data recorded thereon for in-situ in an driving vehicle, including instructions to cause the machine to:
  obtain, by the vehicle in a lane of drivable area including at least one shoulder, sensor data using the at least one sensor included in the vehicle;
  determine that the lane is directly adjacent to the at least one shoulder along a first side of the lane;
  identify an object in front of the vehicle;
    determine that the object is in the at least one shoulder of the drivable area;
  determine whether or not performing a lane change maneuver out of the lane prior to the vehicle being positioned adjacent to the object is feasible;
  in response to determining that performing a lane change maneuver is feasible, performing the lane change maneuver prior to the vehicle being positioned adjacent to the object; and
  in response to determining that performing a lane change maneuver is not feasible, performing at least one off (1) a lateral shift of the vehicle away from the object while remaining within the lane prior to the vehicle being positioned adjacent to the object, or (2) a deceleration of the vehicle.

16. The non-transitory, machine-readable medium of claim 15, wherein the operations further comprise:
  identifying at least one of a position or a speed of the object relative to the vehicle to determine a maximum amount of time the autonomous vehicle has prior to the vehicle being positioned adjacent to the object.

17. The non-transitory, machine-readable medium of claim 15, wherein:
  the sensor data includes a representation of a position of the object and a speed of the object; and
  the operations further comprise:
    determining at least one of a remaining time value or a remaining distance value until the vehicle is adjacent to the object based the position of the object and the speed of the object, wherein the lane is a first lane, and the performing of the lane change maneuver is feasible when (1) a second lane located adjacent to the first lane along a second side opposite from the first side exists, (2) an obstacle would not be present in the second lane along the vehicle as the lane change maneuver is performed, and (3) the lane change maneuver can be completed prior to at least one of the remaining distance value or the remaining time value being zero.

18. The non-transitory, machine-readable medium of claim 15, wherein the sensor data includes image data, the image data includes a representation of the object, and the object is identified from the representation of the object using computer vision.

19. The non-transitory, machine-readable medium of claim 15, wherein the operations further comprise:
  causing at least one of an audio warning or a visual warning to be output to at least one of a driver or a passenger inside the vehicle after determining that the object is in the at least one shoulder of the drivable area.

20. The non-transitory, machine-readable medium of claim 15, wherein the vehicle weighs at least 11,793 kilograms.

* * * * *